(12) United States Patent
Nakadate

(10) Patent No.: US 7,694,785 B2
(45) Date of Patent: Apr. 13, 2010

(54) CONTROLLABLE DAMPING FORCE HYDRAULIC SHOCK ABSORBER

(75) Inventor: Takao Nakadate, Yamato (JP)

(73) Assignee: Hitachi, Ltd., Tokyo (JP)

( * ) Notice: Subject to any disclaimer, the term of this patent is extended or adjusted under 35 U.S.C. 154(b) by 1021 days.

(21) Appl. No.: 11/389,234

(22) Filed: Mar. 27, 2006

(65) Prior Publication Data

US 2006/0225976 A1 Oct. 12, 2006

(30) Foreign Application Priority Data

Apr. 12, 2005 (JP) ............................. 2005-114505

(51) Int. Cl.
*F16F 9/34* (2006.01)
(52) U.S. Cl. ................. 188/266.5; 188/282.6
(58) Field of Classification Search ............. 188/266, 188/266.2–266.5, 282.1–282.6, 322.15, 322.22
See application file for complete search history.

(56) References Cited

U.S. PATENT DOCUMENTS

| | | | | |
|---|---|---|---|---|
| 4,512,447 A | * | 4/1985 | Miura | 188/282.6 |
| 4,834,222 A | * | 5/1989 | Kato et al. | 188/280 |
| 4,964,493 A | * | 10/1990 | Yamaura et al. | 188/282.6 |
| 5,316,113 A | * | 5/1994 | Yamaoka | 188/282.6 |
| 6,371,262 B1 | * | 4/2002 | Katou et al. | 188/266.5 |
| 6,474,454 B2 | * | 11/2002 | Matsumoto et al. | 188/282.6 |
| 6,782,980 B2 | * | 8/2004 | Nakadate | 188/313 |
| 7,040,468 B2 | * | 5/2006 | Shinata | 188/322.15 |
| 7,322,449 B2 | * | 1/2008 | Yamaguchi | 188/282.3 |
| 7,458,448 B2 | * | 12/2008 | Katou et al. | 188/282.6 |

FOREIGN PATENT DOCUMENTS

JP 2003-278819 10/2003

* cited by examiner

*Primary Examiner*—Christopher P Schwartz
(74) *Attorney, Agent, or Firm*—Wenderoth, Lind & Ponack, L.L.P.

(57) ABSTRACT

A controllable damping force hydraulic shock absorber including a pilot type damping valve having a back-pressure chamber for each of an extension stroke and a compression stroke. A piston connected to a piston rod is fitted into a sealed cylinder in which a hydraulic fluid is contained. During an extension stroke of the piston rod, the hydraulic fluid in an upper cylinder chamber flows to a lower cylinder chamber through an extension-side hydraulic fluid passage, an extension-side orifice hydraulic fluid passage, an extension-side back-pressure chamber, an axial hydraulic fluid passage, a radial hydraulic fluid passage, a compression-side back-pressure chamber, an extension-side check valve and a compression-side hydraulic fluid passage. During a compression stroke, the hydraulic fluid in the lower cylinder chamber flows to the upper cylinder chamber through the compression-side hydraulic fluid passage, the compression-side orifice passage, the compression-side back-pressure chamber, the radial hydraulic fluid passage, the axial hydraulic fluid passage, the extension-side back-pressure chamber, the compression-side check valve and the extension-side hydraulic passage. The hydraulic fluid passage for an extension stroke and the hydraulic fluid passage for a compression stroke have some elements in common, thus simplifying the structure of the controllable damping force hydraulic shock absorber.

12 Claims, 5 Drawing Sheets

CONTROLLABLE DAMPING FORCE HYDRAULIC SHOCK ABSORBER

BACKGROUND OF THE INVENTION

The present invention relates to a controllable damping force hydraulic shock absorber capable of appropriately controlling damping force characteristics.

As a hydraulic shock absorber mounted on a suspension apparatus of a vehicle such as an automobile, there is known a controllable damping force hydraulic shock absorber in which damping force characteristics can be appropriately controlled according to road surface conditions, vehicle running conditions, etc., so as to improve ride comfort and steering stability.

Generally, a controllable damping force hydraulic shock absorber comprises a sealed cylinder in which a hydraulic fluid is contained, and a piston connected to a piston rod is slidably fitted into the cylinder. The piston divides the inside of the cylinder into two chambers. The piston is provided with a main hydraulic fluid passage and a bypass passage which permit communication between the two chambers in the cylinder. The main hydraulic fluid passage is provided with a damping force generating mechanism including an orifice and a disk valve, and the bypass passage is provided with a damping force controlling valve for changing a flow path area of the bypass passage.

In this arrangement, the bypass passage is opened by means of the damping force controlling valve, to thereby reduce a resistance to the flow of the hydraulic fluid between the two cylinder chambers, and thus reducing a damping force. To increase a damping force, the bypass passage is closed, to thereby increase the flow resistance between the two chambers. Thus, damping force characteristics are controlled by opening/closing the damping force controlling valve.

However, when a damping force is controlled only by changing the flow path area of the bypass passage, the following problem arises. That is, although damping force characteristics can be changed to a large extent in a low piston speed region in which a damping force is dependent on the restriction of an orifice in a fluid passage, damping force characteristics cannot be greatly changed in intermediate and high piston speed regions in which a damping force is dependent on the degree of opening of the damping force generating mechanism (disk valve) in the main hydraulic fluid passage.

As a countermeasure, there is known a controllable damping force hydraulic shock absorber, as disclosed in Unexamined Japanese Patent Application Public Disclosure (Kokai) No. 2003-278819, in which a pilot type damping force controlling valve is provided as a damping force generating mechanism in a main hydraulic fluid passage. In this pilot type damping force controlling valve, a back-pressure chamber (a pilot chamber) is formed at the back of a disk valve. The back-pressure chamber is communicated through a fixed orifice with a cylinder chamber on the upstream side of the disk valve and communicated with a cylinder chamber on the downstream side of the disk valve through a flow rate control valve (a pilot control valve).

In this controllable damping force hydraulic shock absorber, the flow rate control valve is operated, to thereby directly control the flow path area of a flow passage between the two chambers in the cylinder, while the pressure in the pilot chamber is changed due to a pressure loss at the flow rate control valve, to thereby change the valve-opening pressure of the disk valve. Thus, orifice characteristics (in which a damping force is approximately proportional to the square of the piston speed) and valve characteristics (in which a damping force is approximately proportional to the piston speed) can be controlled simultaneously, thus making it possible to control damping force characteristics within a wide range.

However, in the above-mentioned controllable damping force shock absorber, when the pilot type damping force controlling valve is provided for each of an extension stroke and a compression stroke, independent hydraulic fluid passages are required to be formed for an extension stroke and a compression stroke, so that the structure of the hydraulic shock absorber becomes complicated. This results in high manufacturing costs and makes it difficult to ensure durability and reliability of the hydraulic shock absorber.

SUMMARY OF THE INVENTION

The present invention has been made in view of the above stated problems. It is an object of the present invention to provide a controllable damping force hydraulic shock absorber which comprises a pilot type damping valve for each of an extension stroke and a compression stroke, and which has a simple structure.

The present invention provides a controllable damping force hydraulic shock absorber comprising:
  a sealed cylinder in which a hydraulic fluid is contained;
  a piston slidably fitted into the cylinder;
  a piston rod connected to the piston and extending to an outside of the cylinder;
  an extension-side hydraulic fluid passage and a compression-side hydraulic fluid passage provided in the piston;
  an extension-side main valve provided in the extension-side hydraulic fluid passage;
  an extension-side back-pressure chamber for controlling a valve-opening pressure of the extension-side main valve;
  an extension-side orifice passage for introducing the hydraulic fluid from the extension-side hydraulic fluid passage to the extension-side back-pressure chamber;
  a compression-side main valve provided in the compression-side hydraulic fluid passage;
  a compression-side back-pressure chamber for controlling a valve-opening pressure of the compression-side main valve;
  a compression-side orifice passage for introducing the hydraulic fluid from the compression-side hydraulic fluid passage to the compression-side back-pressure chamber;
  a common passage for allowing communication between the extension-side back-pressure chamber and the compression-side back-pressure chamber; and
  a damping force controlling valve for controlling flow of the hydraulic fluid in the common passage.

The controllable damping force hydraulic shock absorber of the present invention may further comprise at least one of an extension-side check valve for allowing flow of the hydraulic fluid only from the compression-side back-pressure chamber to the compression-side hydraulic fluid passage and a compression-side check valve for allowing flow of the hydraulic fluid only from the extension-side back-pressure chamber to the extension-side hydraulic fluid passage.

The controllable damping force hydraulic shock absorber may further comprise a case having an actuator provided therein, the actuator being adapted to control opening and closing of the damping force controlling valve, the case including a discharge passage for discharge of a fluid which enters the case to the cylinder, and a discharge check valve for allowing only said discharge of the fluid.

The damping force controlling valve may be a pressure control type valve.

The damping force controlling valve may include one valve body adapted to be driven by means of a solenoid and a valve seat on which the valve body is adapted to be seated, said valve body, when seated on the valve seat, having an extension-side pressure-receiving portion for receiving a pressure in the extension-side back-pressure chamber and a compression-side pressure-receiving portion for receiving a pressure in the compression-side back-pressure chamber.

DETAILED DESCRIPTION OF THE INVENTION

Hereinbelow, description is made in detail with regard to an embodiment of the present invention, with reference to the accompanying drawings.

Figure 2:
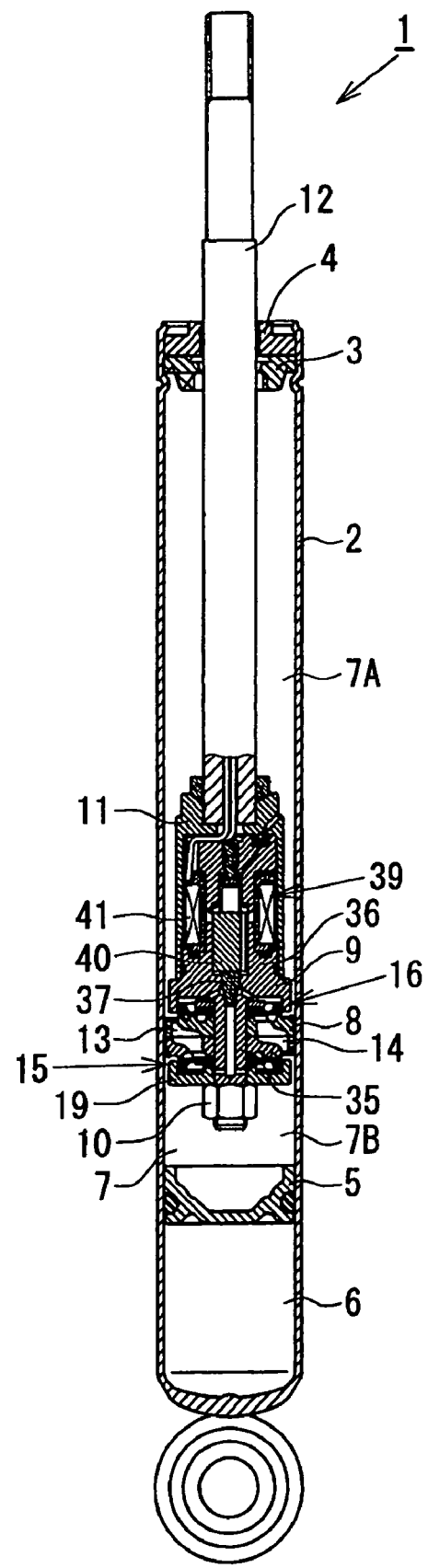
FIG. 2 shows a vertical section of the controllable damping force hydraulic shock absorber of FIG. 1.

As shown in FIG. 2, a controllable damping force hydraulic shock absorber 1 in this embodiment comprises a monotube type hydraulic shock absorber. It comprises a cylinder 2 in the form of a circular cylinder having one end closed, with a rod guide 3 and an oil seal 4 being attached to an open end thereof. A free piston 5 is slidably fitted into the cylinder 2 on a side of the closed end thereof. An inside of the cylinder 2 is divided into a gas chamber 6 formed on a side of the closed end of the cylinder 2 and a hydraulic chamber 7 formed on a side of the open end of the cylinder 2. A high-pressure gas is sealed in the gas chamber 6, and a hydraulic fluid is sealed in the hydraulic chamber 7.

A piston 8 is slidably fitted into the hydraulic chamber 7 of the cylinder 2. By means of the piston 8, an inside of the hydraulic chamber 7 is divided into an upper cylinder chamber 7A and a lower cylinder chamber 7B. A distal end portion of a piston bolt 9 is inserted through the piston 8, and fixed by means of a nut 10. A proximal end portion (an upper portion as viewed in FIG. 2) of the piston bolt 9 is connected to a case 11 substantially in the form of a circular cylinder having one end closed. The closed end of the case 11 is connected to one end portion (a lower portion as viewed in FIG. 2) of a piston rod 12. The other end portion of the piston rod 12 slidably and liquid-tightly extends through the rod guide 3 and the oil seal 4 to an outside of the cylinder 2.

The piston 8 includes an extension-side hydraulic fluid passage 13 which opens into the upper cylinder chamber 7A and a compression-side hydraulic fluid passage 14 which opens into the lower cylinder chamber 7B. An extension-side damping valve 15 for controlling a flow of the hydraulic fluid in the extension-side hydraulic fluid passage 13 is provided at a lower end portion of the piston 8. A compression-side damping valve 16 for controlling a flow of the hydraulic fluid in the compression-side hydraulic fluid passage 14 is provided at an upper end portion of the piston 8.

Next, referring to FIG. 1 and FIGS. 3 to 8, description is made with regard to the extension-side damping valve 15 and the compression-side damping valve 16.

Figure 1:
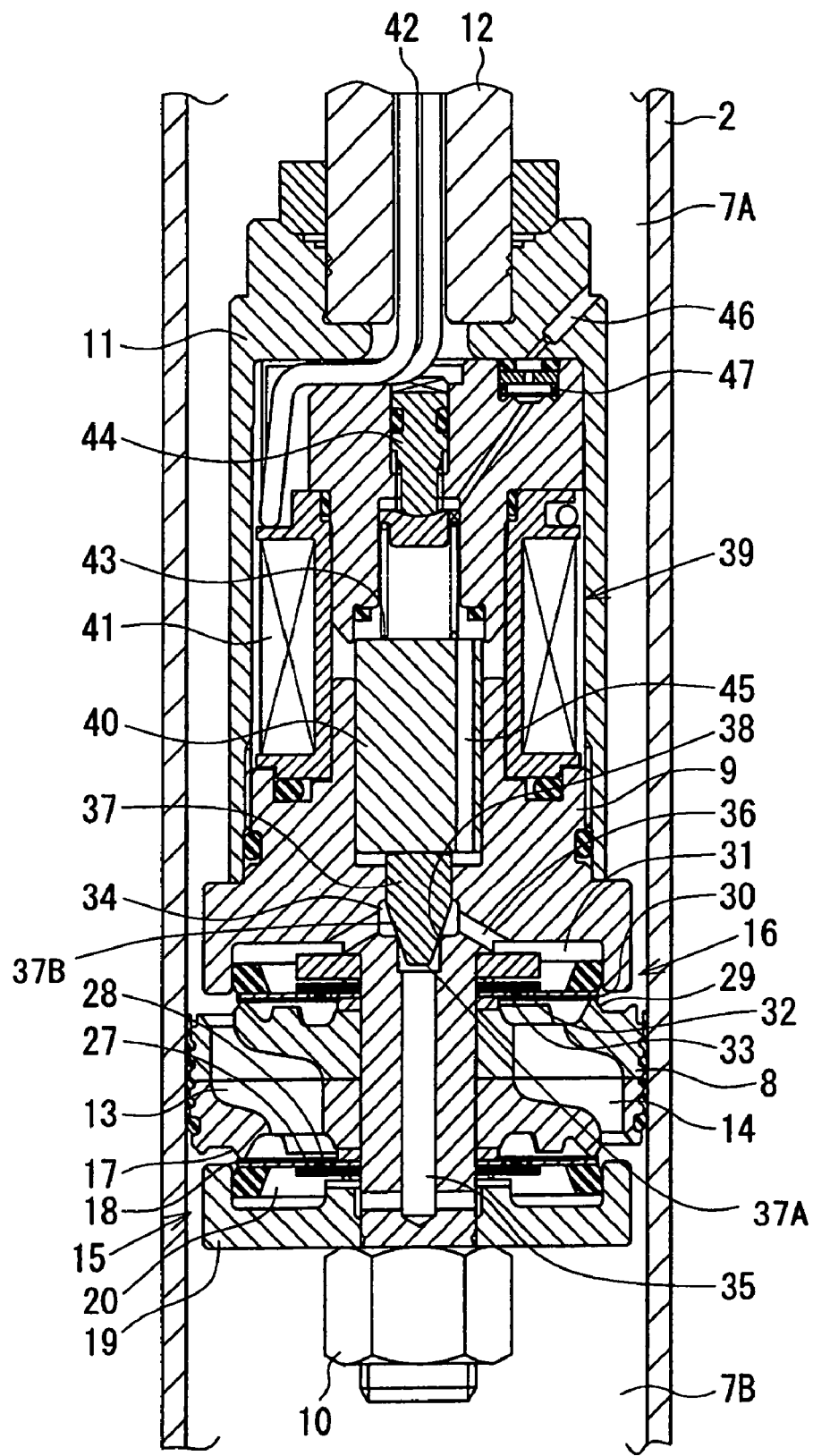
FIG. 1 is an enlarged view of a vertical section of an essential part of a controllable damping force hydraulic shock absorber according to an embodiment of the present invention.
Figure 3:
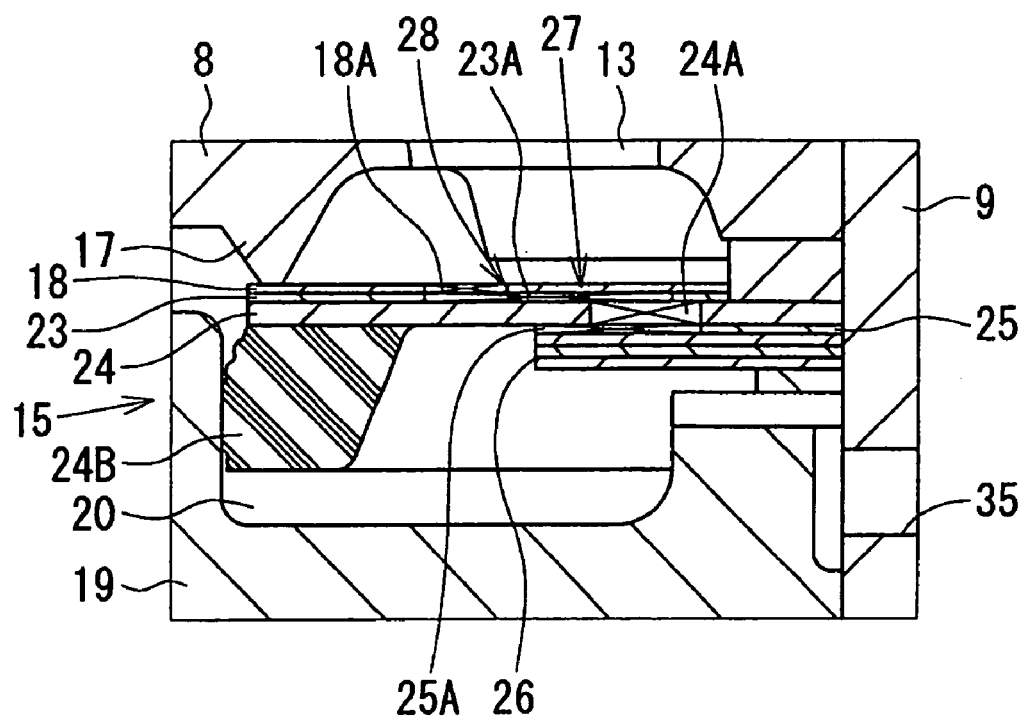
FIG. 3 is an enlarged view of an extension-side damping valve in the controllable damping force hydraulic shock absorber of FIG. 1.

As shown in FIGS. 1 and 3, the extension-side damping valve 15 comprises a main valve 18 (a disk valve) seated on a seat portion 17 formed in a lower end face of the piston 8, and also comprises an extension-side back-pressure chamber 20 formed at the back of the main valve 18 by means of a valve member 19 attached to the piston bolt 9 by means of the nut 10.

Figure 4:
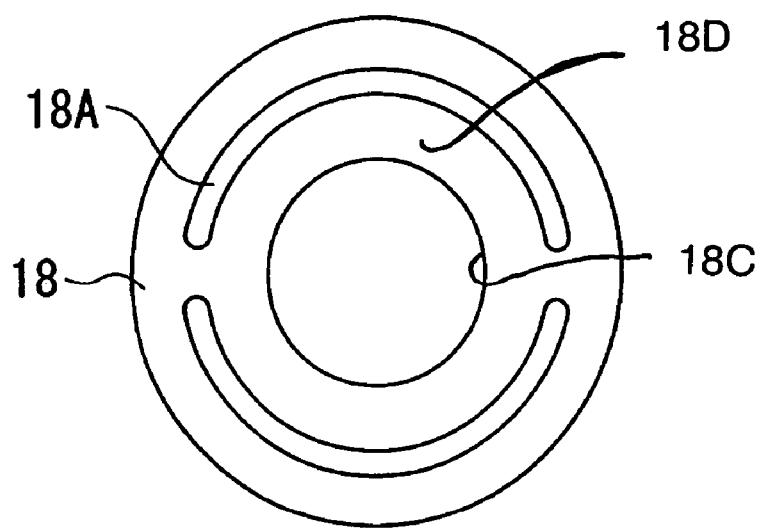
FIG. 4 is a plan view of an extension-side main valve in the extension-side damping valve of FIG. 3.

As shown in FIG. 4, the extension-side main valve 18 includes a pair of arcuate openings 18A. The extension-side main valve 18 further includes a central opening 18C, into which the distal end portion of the piston bolt 9 is loosely fitted. Therefore, an inner-side portion 18D between the pair of arcuate openings 18A and the central opening 18C is movable with flexibility. Disks 23, 24, 25 and 26 are stacked one on top of the other on the extension-side main valve 18.

Figure 5:
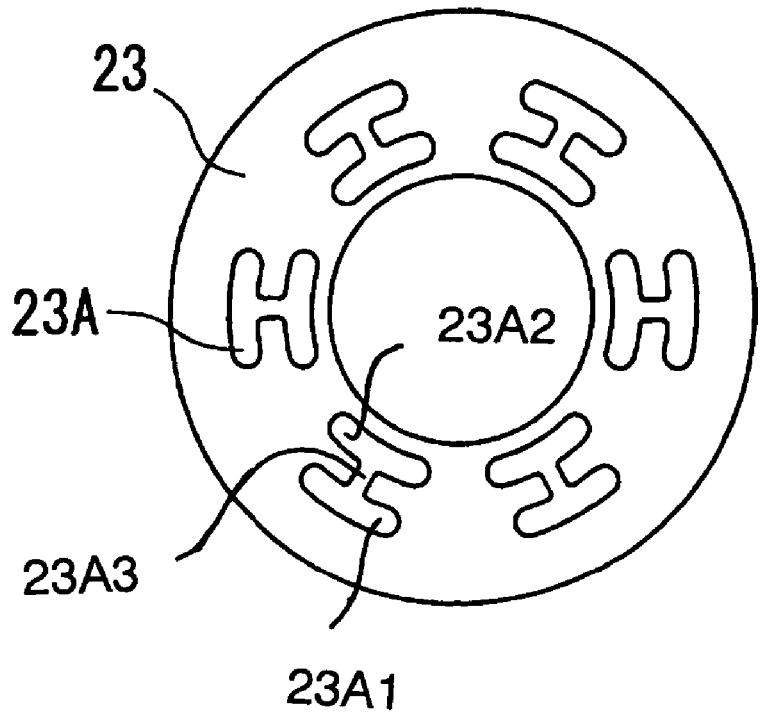
FIG. 5 is a plan view of a disk stacked on the extension-side main valve of FIG. 4.
Figure 6:
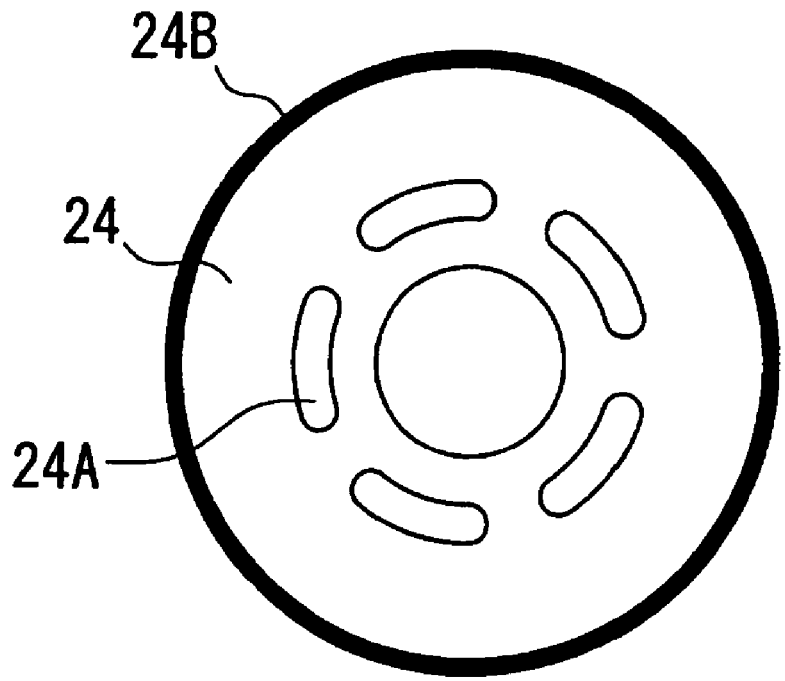
FIG. 6 is a plan view of a disk stacked on the disk shown in FIG. 5.
Figure 7:
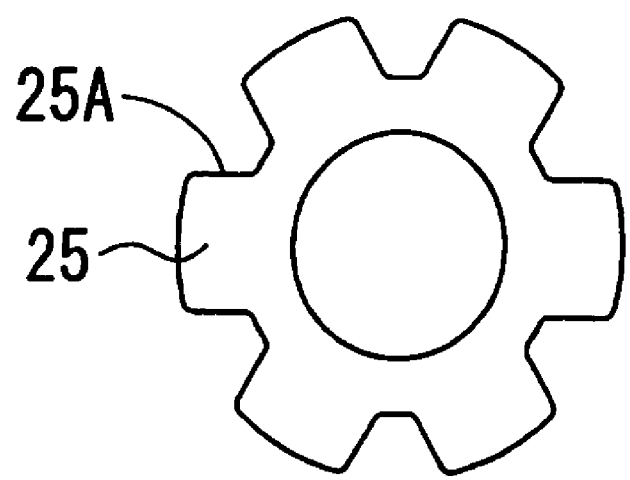
FIG. 7 is a plan view of a disk stacked on the disk shown in FIG. 6.
Figure 8:
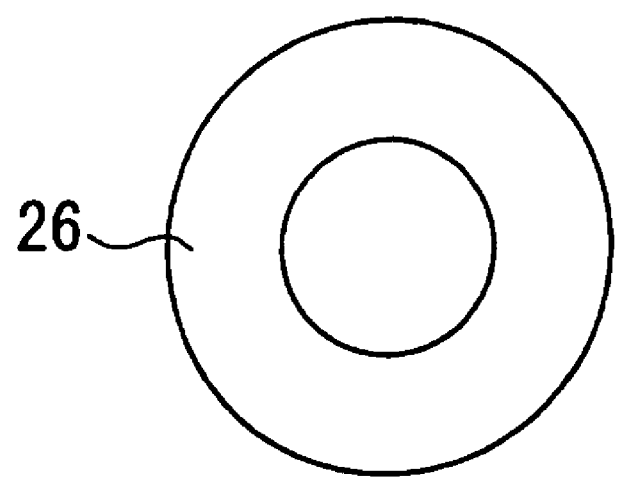
FIG. 8 is a plan view of a disk stacked on the disk shown in FIG. 7.

As shown in FIG. 5, the disk 23 includes a plurality of H-shaped openings 23A. As shown in FIG. 6, the disk 24 includes a plurality of arcuate openings 24A and an outer circumferential seal member 24B. The disk 25 includes a plurality of cut portions 25A formed in an outer periphery thereof, as shown in FIG. 7. The disk 26 is a plain disk, as shown in FIG. 8. Each of the H-shaped openings 23A of the disk 23 comprises an outer-side opening 23A1 and an inner-side opening 23A2, both of which extend in a circumferential direction, and a radial opening 23A3, which extends in a radial direction so as to allow communication between the outer-side opening 23A1 and the inner-side opening 23A2. The pair of arcuate openings 18A of the extension-side main valve 18 is aligned with the outer-side openings 23A1 of the H-shaped openings 23A of the disk 23. Of the H-shaped openings 23A of the disk 23, the inner-side openings 23A2 are aligned with the arcuate openings 24A of the disk 24. The arcuate openings 24A of the disk 24 are partially aligned with the cut portions 25A of the disk 25. With this arrangement, an extension-side orifice passage 27 which always allows communication between the extension-side hydraulic fluid passage 13 and the extension-side back-pressure chamber 20, and a compression-side check valve 28, which allows only a flow of the hydraulic fluid from the extension-side back-pressure chamber 20 to the extension-side hydraulic fluid passage 13, are formed between the extension-side hydraulic fluid passage and the extension-side back-pressure chamber (Note that the extension-side orifice passage 27 and the compression-side check valve 28 share much of their components). That is, the extension-side orifice passage 27 comprises the openings 18A of the extension-side main valve 18, the openings 23A of the disk 23, the openings 24A of the disk 24 and the cut portions 25A of the disk 25. Therefore, the hydraulic fluid flows from the extension-side hydraulic fluid passage 13 to the extension-side back-pressure chamber 20 through the openings 18A of the extension-side main valve 18, the outer-side openings 23A1 of the disk 23, the radial openings 23A3 of the disk 23, the inner-side openings 23A2 of the disk 23, the openings 24A of the disk 24 and the cut portions 25A of the disk 25. The compression-side check valve 28 comprises the cut portions 25A of the disk 25, the openings 24A of the disk 24, the openings 23A of the disk 23 and the inner-side portion 18D of the extension-side main valve 18. The hydraulic fluid flows from the extension-side back-pressure chamber 20 to the extension-side hydraulic fluid passage 13 through the cut portions 25A of the disk 25, the openings 24A of the disk 24 and the openings 23A of the disk 23 while deflecting the inner-side portion 18D of the extension-side main valve 18. More specifically, when a pressure is applied from the extension-side back-pressure chamber 20 towards the extension-side hydraulic fluid passage 13, the inner-side portion 18D of the extension-side main valve 18, which is movable with flexibility, is deflected towards the extension-side hydraulic fluid passage 13, to thereby allow all the openings 23A of the disk 23 to be communicated with the extension-side hydraulic fluid passage 13 at the same time. Therefore, resistance to the flow of hydraulic fluid through the compression-side check valve 28 becomes low as compared to the extension-side orifice passage 27.

The extension-side back-pressure chamber 20 is sealed by the seal member 24B of the disk 24. An internal pressure of the extension-side back-pressure chamber 20 acts on the extension-side main valve 18 in a valve-closing direction.

The compression-side damping valve 16 comprises a compression-side main valve 30 (a disk valve) seated on a seat portion 29 formed in an upper end face of the piston 8, and a compression-side back-pressure chamber 31 formed at the back of the main valve 30 by means of the distal end portion of the piston bolt 9.

As in the case of the extension-side main valve 18, a plurality of disks having openings or cut portions are stacked one on top of the other on the compression-side main valve 30. These valves form a compression-side orifice passage 32 which always allows communication between the compression-side hydraulic fluid passage 14 and the compression-side back-pressure chamber 31, and an extension-side check valve 33 which allows only a flow of the hydraulic fluid from the compression-side back-pressure chamber 31 to the compression-side hydraulic fluid passage 14. An internal pressure of the compression-side back-pressure chamber 31 acts on the compression-side main valve 30 in a valve-closing direction.

The piston bolt 9 includes a valve chamber 34, which is formed on a side of a base end portion of the piston bolt 9 relative to the distal end portion. The valve chamber 34 is communicated with the extension-side back-pressure chamber 20 through an axial hydraulic fluid passage 35 (a common passage) extending along the center axis of the distal end portion of the piston bolt 9. The valve chamber 34 is also communicated with the compression-side back-pressure chamber 31 through a radial hydraulic fluid passage 36 (a common passage) extending in a radial direction while being inclined. A poppet valve 37 (a damping force controlling valve) is inserted into the valve chamber 34. The poppet valve 37 (a valve body), which has a conical form, is adapted to be separated from or seated on a circular seat portion 38 (a valve seat) formed in the valve chamber 34, to thereby open or close a flow passage between the axial hydraulic fluid passage 35 and the radial hydraulic fluid passage 36.

The poppet valve 37 includes an extension-side pressure-receiving portion 37A for receiving a pressure in the extension-side back-pressure chamber 20 and a compression-side pressure-receiving portion 37B for receiving a pressure in the compression-side back-pressure chamber 36. The extension-side pressure-receiving portion 37A and the compression-side pressure-receiving portion 37B are divided by the seat portion 38. Therefore, a pressure-receiving surface area for an extension stroke is a surface area inside the seat portion 38, and a pressure-receiving surface area for a compression stroke is a ring-shaped surface area obtained by subtracting the surface area inside the seat portion 38 from a surface area inside an outermost periphery of the poppet valve 37.

A solenoid actuator (an actuator) 39 is provided in the case 11. The poppet valve 37 is connected to a plunger 40 of the solenoid actuator 39. By applying a current to a coil 41 of the solenoid actuator 39, a valve-opening pressure of the poppet valve 37 can be controlled (the poppet valve 37 is a so-called pressure control type). A lead wire 42 for applying a current to the coil 41 extends through the hollow piston rod 12 to the outside. Under a force of a valve spring 43, the plunger 40 is biased in a direction for closing the flow passage between the axial hydraulic fluid passage 35 and the radial hydraulic fluid passage 36. An adjusting screw 44 is provided so as to enable adjustment of a set load of the valve spring 43. A balance passage 45 extends through the plunger 40 in an axial direction thereof, so as to balance the fluid pressures acting on opposite ends of the plunger 40. The closed end of the case 11 includes a passage 46 for discharging gas bubbles (a fluid) generated in the case 11 during manufacture and a discharge check valve 47 for allowing only the discharge of gas bubbles. The discharge check valve 47 enables not only the discharge of gas bubbles to be readily conducted during manufacture as described above, but also enables, during an extension stroke of the piston rod 12, the hydraulic fluid (a fluid) in the upper cylinder chamber 7A to be prevented from entering the inside of the solenoid actuator 39. Further, during a compression stroke of the piston rod 12, the discharge check valve 47 enables the pressure in the solenoid actuator 39, which is likely to be increased due to leakage of the hydraulic fluid in the compression-side back-pressure chamber 36 through an area around the poppet valve 37, to be released into the upper cylinder chamber 7A. Consequently, during both an extension stroke and a compression stroke, a damping force can be controlled in a stable manner, that is, a stable damping force can be generated.

Next, description is made below with regard to an operation of the controllable damping force hydraulic shock absorber arranged as mentioned above.

During an extension stroke of the piston rod 12, before the extension-side main valve 18 opens, the hydraulic fluid in the upper cylinder chamber 7A flows to the lower cylinder chamber 7B through the extension-side hydraulic fluid passage 13, the extension-side orifice passage 27, the extension-side back-pressure chamber 20, the axial hydraulic fluid passage 35, the valve chamber 34, the radial hydraulic fluid passage 36, the compression-side back-pressure chamber 31, the extension-side check valve 33 and the compression-side hydraulic fluid passage 14. When the pressure of the hydraulic fluid in the upper cylinder chamber 7A reaches the valve-opening pressure of the extension-side main valve 18, the extension-side main valve 18 opens, and the hydraulic fluid flows from the extension-side hydraulic fluid passage 13 directly to the lower cylinder chamber 7B. A change in volume inside the cylinder 2 due to entry of the piston rod 12 into the cylinder 2 is compensated for by compression of the high-pressure gas in the gas chamber 6.

Further, by controlling the current applied to the coil 41 of the solenoid actuator 39, the valve-opening pressure of the poppet valve 37 can be controlled, thus directly controlling the flow of hydraulic fluid between the axial hydraulic fluid passage 35 and the radial hydraulic fluid passage 36, to thereby control a damping force. At the same time, the internal pressure of the extension-side back-pressure chamber 20 can also be controlled, to thereby control the valve-opening pressure of the extension-side main valve 18.

During a compression stroke of the piston rod 12, before the compression-side main valve 30 opens, the hydraulic fluid in the lower cylinder chamber 7B flows to the upper cylinder chamber 7A through the compression-side hydraulic fluid passage 14, the compression-side orifice passage 32, the compression-side back-pressure chamber 31, the radial hydraulic fluid passage 36, the valve chamber 34, the axial hydraulic fluid passage 35, the extension-side back-pressure chamber 20, the compression-side check valve 28 and the extension-side hydraulic fluid passage 13. When the pressure of the hydraulic fluid in the lower cylinder chamber 7B reaches the valve-opening pressure of the compression-side main valve 30, the compression-side main valve 30 opens, and the hydraulic fluid flows from the compression-side hydraulic fluid passage 14 directly to the upper cylinder chamber 7A. A change in volume inside the cylinder 2 due to exit of the piston rod 12 from the cylinder 2 is compensated for by expansion of the high-pressure gas in the gas chamber 6.

Further, as in the case of an extension stroke, by controlling the current applied to the coil 41 of the solenoid actuator 39, the valve-opening pressure of the poppet valve 37 can be controlled, thus directly controlling the flow of hydraulic fluid between the radial hydraulic fluid passage 36 and the axial hydraulic fluid passage 35, to thereby control a damping force. At the same time, the internal pressure of the compression-side back-pressure chamber 31 can also be controlled, to thereby control the valve-opening pressure of the compression-side main valve 30.

Thus, a damping force for an extension stroke and a damping force for a compression stroke can be controlled by means of the same poppet valve 37. At the same time, the internal pressures of the extension-side and compression-side back-pressure chambers 20 and 31 can also be controlled, to thereby control the valve-opening pressures of the extension-side and compression-side main valves 18 and 30. Therefore, a damping force can be directly controlled by controlling a current applied to the coil 41. In hydraulic shock absorbers, a damping force increases according to the piston speed. According to the above-mentioned embodiment of the present invention, in a region of the piston speed being equal to or greater than a predetermined value, an increase in damping force is small relative to a change in the piston speed, thus making it possible to effect ideal control of a damping force. Further, damping force characteristics can be controlled in a wide range.

In addition, a pressure-receiving surface area of the poppet valve 37 is different for an extension stroke and a compression stroke. Therefore, by controlling the diameter of the seat portion 38 so as to appropriately set the pressure-receiving areas, damping force characteristics for an extension stroke and a compression stroke can be set as desired.

During an extension stroke, on the downstream side of the poppet valve 37, the hydraulic fluid flows through the compression-side back-pressure chamber 31 of the compression-side damping valve 16, the extension-side check valve 33 and the compression-side hydraulic fluid passage 14. During a compression stroke, on the downstream side of the poppet valve 37, the hydraulic fluid flows through the extension-side back-pressure chamber 20 of the extension-side damping valve 15, the compression-side check valve 28 and the extension-side hydraulic fluid passage 13. The hydraulic fluid passage for an extension side and the hydraulic fluid passage for a compression stroke have some elements in common. This results in a simplified structure, low manufacturing costs and high durability and reliability of the controllable damping force hydraulic shock absorber. Further, due to the simplification of structure described above, an axial dimension of the piston can be reduced, thus ensuring a sufficient stroke for the hydraulic shock absorber.

In the above-mentioned embodiment, when the flow path areas of the extension-side and compression-side orifice passages 27 and 32 are sufficiently large, the compression-side and extension-side check valves 28 and 33 of the extension-side and compression-side damping valves 15 and 16 can be omitted and these orifice passages can be used in place of the check valves 28 and 33.

In the above-mentioned embodiment, the orifice passages 27 and 32 are formed in the valves. However, this does not limit the present invention. An orifice passage may be formed in the piston 8 in parallel with the extension-side hydraulic fluid passage 13, so as to allow communication between the extension-side back-pressure chamber 20 and the upper cylinder chamber 7A. The same applies to the compression-side structure.

In a controllable damping force hydraulic shock absorber according to the above embodiment, a damping force for an extension stroke and a damping force for a compression stroke can be controlled by means of a damping force controlling valve. At the same time, the internal pressures of the extension-side and compression-side back-pressure chambers can also be controlled, to thereby control the valve-opening pressures of the extension-side and compression-side main valves. Further, during an extension stroke of the piston rod, the hydraulic fluid passes through the damping force controlling valve and flows through the compression-side back-pressure chamber, the compression-side orifice passage and the compression-side hydraulic fluid passage, and, during a compression stroke, the hydraulic fluid passes through the damping force controlling valve and flows through the extension-side back-pressure chamber, the extension-side orifice passage and the extension-side hydraulic fluid passage. Thus, the hydraulic fluid passage for an extension stroke and the hydraulic fluid passage for a compression stroke have some elements in common. This results in a simplified structure of the controllable damping force hydraulic shock absorber.

Further, in the controllable damping force hydraulic shock absorber according to the above embodiment, during an extension stroke of the piston rod, the hydraulic fluid flows from the compression-side back-pressure chamber to the compression-side hydraulic fluid passage while bypassing the compression-side orifice passage due to the extension-side check valve. During a compression stroke, the hydraulic fluid flows from the extension-side back-pressure chamber to the extension-side hydraulic fluid passage while bypassing the extension-side orifice passage due to the compression-side check valve. Therefore, a flow path area on the downstream side of the damping force controlling valve can be increased.

Further, in the controllable damping force hydraulic shock absorber according to the above embodiment, if the pressure in the case becomes high, the pressure can be released to the cylinder through the discharge check valve. Therefore, the actuator provided in the case for controlling opening and closing of the damping force controlling valve can be operated in a stable manner.

Further, in the controllable damping force hydraulic shock absorber according to the above embodiment, by arranging the damping force controlling valve as a pressure control type valve, the pressure in the back-pressure chamber can be directly controlled. Therefore, a damping force can be controlled without being significantly affected by a change in the piston speed.

In the controllable damping force hydraulic shock absorber according to the above embodiment, the extension-side pressure-receiving portion for receiving a pressure in the extension-side back-pressure chamber and the compression-side pressure-receiving portion for receiving a pressure in the compression-side back-pressure chamber are formed in a single valve body. Therefore, it is possible to control a damping force for each of an extension stroke and a compression stroke with a simple structure.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The entire disclosure of Japanese Patent Application No. 2005-114505 filed on Apr. 12, 2005 including specification, claims, drawings and summary is incorporated herein by reference in its entirety.

What is claimed is:

1. A controllable damping force hydraulic shock absorber comprising:
    a sealed cylinder in which a hydraulic fluid is contained;
    a piston slidably fitted into the cylinder;
    a piston rod connected to the piston and extending to an outside of the cylinder;
    an extension-side hydraulic fluid passage and a compression-side hydraulic fluid passage provided in the piston;
    an extension-side main valve provided in the extension-side hydraulic fluid passage;
    an extension-side back-pressure chamber for controlling a valve-opening pressure of the extension-side main valve;
    an extension-side orifice passage for introducing the hydraulic fluid from the extension-side hydraulic fluid passage to the extension-side back-pressure chamber;
    a compression-side main valve provided in the compression-side hydraulic fluid passage;
    a compression-side back-pressure chamber for controlling a valve-opening pressure of the compression-side main valve;
    a compression-side orifice passage for introducing the hydraulic fluid from the compression-side hydraulic fluid passage to the compression-side back-pressure chamber;
    a common passage for allowing communication between the extension-side back-pressure chamber and the compression-side back-pressure chamber; and
    a damping force controlling valve disposed in the common passage to be commonly used for an extension side stroke and a compression side stroke of the shock absorber, the damping force controlling valve being adapted to be seated on and separated from a seat portion formed in a valve chamber communicating with the common passage, thereby opening and closing a hydraulic fluid flow passage between the common passage and the valve chamber,
    wherein, in one of the extension side stroke and the compression side stroke, the hydraulic fluid in the same side one of the extension-side back-pressure chamber and the compression-side back-pressure chamber flows through the common passage and the hydraulic fluid passage of the other side.

2. A controllable damping force hydraulic shock absorber according to claim 1, further comprising at least one of an extension-side check valve for allowing flow of the hydraulic fluid only from the compression-side back-pressure chamber to the compression-side hydraulic fluid passage and a compression-side check valve for allowing flow of the hydraulic fluid only from the extension-side back-pressure chamber to the extension-side hydraulic fluid passage.

3. A controllable damping force hydraulic shock absorber according to claim 2, further comprising a case having an actuator provided therein, the actuator being adapted to control opening and closing of the damping force controlling valve, the case including a discharge passage for discharge of a fluid which enters the case to the cylinder, and a discharge check valve for allowing only said discharge of the fluid.

4. A controllable damping force hydraulic shock absorber according to claim 3, wherein said damping force controlling valve is a pressure control type valve.

5. A controllable damping force hydraulic shock absorber according to claim 4, wherein said damping force controlling valve includes one valve body adapted to be driven by means of a solenoid and a valve seat on which the valve body is adapted to be seated, said valve body, when seated on the valve seat, having an extension-side pressure-receiving portion for receiving a pressure in the extension-side back-pressure chamber and a compression-side pressure-receiving portion for receiving a pressure in the compression-side back-pressure chamber.

6. A controllable damping force hydraulic shock absorber according to claim 2, wherein said damping force controlling valve is a pressure control type valve.

7. A controllable damping force hydraulic shock absorber according to claim 6, wherein said damping force controlling valve includes one valve body adapted to be driven by means of a solenoid and a valve seat on which the valve body is adapted to be seated, said valve body, when seated on the valve seat, having an extension-side pressure-receiving portion for receiving a pressure in the extension-side back-pressure chamber and a compression-side pressure-receiving portion for receiving a pressure in the compression-side back-pressure chamber.

8. A controllable damping force hydraulic shock absorber according to claim 1, further comprising a case having an actuator provided therein, the actuator being adapted to control opening and closing of the damping force controlling valve, the case including a discharge passage for discharge of a fluid which enters the case to the cylinder, and a discharge check valve for allowing only said discharge of the fluid.

9. A controllable damping force hydraulic shock absorber according to claim 8, wherein said damping force controlling valve is a pressure control type valve.

10. A controllable damping force hydraulic shock absorber according to claim 9, wherein said damping force controlling valve includes one valve body adapted to be driven by means of a solenoid and a valve seat on which the valve body is adapted to be seated, said valve body, when seated on the valve seat, having an extension-side pressure-receiving portion for receiving a pressure in the extension-side back-pressure chamber and a compression-side pressure-receiving portion for receiving a pressure in the compression-side back-pressure chamber.

11. A controllable damping force hydraulic shock absorber according to claim 1, wherein said damping force controlling valve is a pressure control type valve.

12. A controllable damping force hydraulic shock absorber according to claim 11, wherein said damping force controlling valve includes one valve body adapted to be driven by means of a solenoid and a valve seat on which the valve body is adapted to be seated, said valve body, when seated on the valve seat, having an extension-side pressure-receiving portion for receiving a pressure in the extension-side back-pressure chamber and a compression-side pressure-receiving portion for receiving a pressure in the compression-side back-pressure chamber.

* * * * *